United States Patent [19]

Kohno et al.

[11] Patent Number: 4,966,261
[45] Date of Patent: Oct. 30, 1990

[54] LOCK-UP TORQUE CONVERTER FOR AUTOMATIC TRANSMISSIONS

[75] Inventors: Satoshi Kohno; Hirofumi Ara, both of Kanagawa, Japan

[73] Assignee: Atsugi Motor Parts Company, Limited, Kenagawa, Japan

[21] Appl. No.: 374,748

[22] Filed: Jul. 3, 1989

[30] Foreign Application Priority Data

Jul. 7, 1988 [JP] Japan ................ 63-169960

[51] Int. Cl.$^5$ .................... F16H 45/02; F16F 15/12
[52] U.S. Cl. .................... 192/3.29; 192/3.28; 192/106.2
[58] Field of Search ............ 192/3.28, 3.29, 3.3, 192/3.31, 106.1, 106.2

[56] References Cited

U.S. PATENT DOCUMENTS

| | | | |
|---|---|---|---|
| 2,623,411 | 12/1952 | Herndon | 192/3.3 |
| 2,726,557 | 12/1955 | Ackerman | 192/3.3 |
| 2,844,049 | 7/1958 | Lapsley et al. | 192/3.3 |
| 3,313,181 | 4/1967 | Leonard et al. | 192/3.3 |
| 3,338,358 | 8/1967 | Christenson et al. | 192/3.3 |
| 4,510,747 | 4/1985 | Yoshida | 192/3.29 |
| 4,689,954 | 9/1987 | Billet | 192/106.2 |

FOREIGN PATENT DOCUMENTS

| | | | |
|---|---|---|---|
| 54-132060 | 10/1979 | Japan . | |
| 57-114059 | 7/1982 | Japan | 192/3.31 |
| 58-79156 | 5/1983 | Japan . | |

Primary Examiner—Rodney H. Bonck
Attorney, Agent, or Firm—Ronald P. Kananen

[57] ABSTRACT

A lock-up torque converter for automatic transmissions which transmits the torque of an internal combustion engine from the engine crankshaft to the transmission input shaft is disclosed. The torque converter includes a converter cover, a turbine hub receiving the input shaft to provide a driving connection, a clutch piston slidably mounted on the turbine hub, and a turbine runner having the outer shell drivingly connected to the hub. The torque converter comprises a first torsional damper operably connected between the clutch piston and the turbine hub to provide a driving connection only when the clutch piston engages the converter cover, and a second torsional damper operably connected between the crankshaft and the converter cover to provide a driving connection during operation of the engine. During operation of the lock-up mechanism, the two dampers cooperatively operate in series with each other to provide an optimum damping effect.

8 Claims, 3 Drawing Sheets 4,966,261

LOCK-UP TORQUE CONVERTER FOR AUTOMATIC TRANSMISSIONS

BACKGROUND OF THE INVENTION

1. Field of The Invention

The present invention relates to a torque converter with a lock-up mechanism for automatic transmissions, which includes two torsional dampers capable of effectively damping or absorbing torsional vibration transmitted from an engine crankshaft through a converter cover to a transmission input shaft, due to fluctuations in torque transmitted from the crankshaft to the torque converter.

2. Description of The Prior Disclosure

As is generally known, the conventional torque converter for automatic automotive transmissions comprises a converter cover, a pump impeller integrally connected to the converter cover, a stator, a turbine runner firmly connected through a turbine hub to a transmission input shaft, and a substantially disc-like drive plate interconnecting the crankshaft and the converter cover by means of a plurality of fasteners, such as bolts so that torque generated by an internal combustion engine is directly transmitted from the crankshaft acting as an output shaft to the pump impeller through the converter cover.

Recently, there have been proposed and developed various torque converters which include a lock-up mechanism which is operable for directly and mechanically interconnecting the turbine runner and the converter cover to transmit torque from the crankshaft directly to the turbine runner during vehicle operation at speeds greater than a predetermined vehicle speed.

For example, a torque converter with a lock-up mechanism having only one torsional damper disposed between the drive plate and the converter cover, has been disclosed in Japanese Utility Model (Jikkai) Showa 58-79156.

Furthermore, another torque converter with a lock-up mechanism having a lock-up torsional damper disposed in the converter cover, has been disclosed in U.S. Pat. No. 4,305,487 entitled "LOCK-UP TORQUE CONVERTER WITH DAMPER" which was granted on Dec. 15, 1981 and assigned to "NISSAN MOTOR COMPANY, LIMITED" this disclosure corresponds to Japanese First Publication (Tokkai) Showa No. 54-132060. In general, the lock-up mechanism for a torque converter of this type includes a lock-up clutch piston slidably fitted on the outer periphery of the turbine hub, an annular clutch facing attached to the perimeter of the clutch piston to establish or terminate the engagement between the inner peripheral wall of the converter cover and the mating surface of the clutch facing, a torsional damper being comprised of a plurality of torsion springs and operably connected between the clutch piston and the turbine hub to provide a driving connection, and a lock-up control valve provided for controlling the operation of the clutch piston. When the vehicle is running at speeds greater than a predetermined vehicle speed, the lock-up mechanism operates in such a manner that the clutch facing on the clutch piston engages the inner peripheral wall of the converter cover. As a result, torque generated by the internal combustion engine is transmitted from the crankshaft through converter cover to the clutch piston, and then from the clutch piston through the torsional damper via the turbine hub to the input shaft. In this manner, during activation of the lock-up mechanism, the output shaft of the torque converter is directly and mechanically connected to the transmission input shaft thereof thereby enabling the vehicle to reduce fuel consumption. However, in the above mentioned torque converters with lock-up mechanisms, torsional vibrations due to fluctuations in torque transmitted from the crankshaft to the drive plate are not sufficiently absorbed, particularly, at low vehicle speeds. For instance, at low revolutions, the engine causes torque fluctuations resulting in a relatively high level of torsional vibration intensity in a drive system, the drive system being comprised of the crankshaft, the torque converter and the input shaft. Under these conditions, the torsional vibration is in part absorbed by the torsional springs operable between the clutch piston and the turbine hub, but this is insufficient. Therefore, the spring constant of the torsional springs, or the torsional rigidity of the torsional damper may traditionally be varied to control the resonance frequency of the above mentioned drive system.

FIG. 5 is a graph representative of the relationship between torsional vibration intensity and the frequency of a torsional vibration at two different torsional rigidities with regard to a conventional torque converter having a lock-up mechanism. In FIG. 5, the curve A designates torsional vibration characteristics of the drive system at a torsional rigidity of $K_1 = 6$ kgfm/deg, where $K_1$ is representative of the torsional rigidity of the torsional damper used in the lock-up mechanism. Curve B designates other torsional vibration characteristics of the drive system at a torsional rigidity of $K_1 = 1$ kgfm/deg. As clearly seen in FIG. 5, the resonance frequency of the drive system is slightly lowered from 58 Hz to 41 Hz, in accordance with the change in the torsional rigidity from 6 kgfm/deg to 1 kgfm/deg. However sufficient reduction of the torsional vibration intensity cannot be obtained only by decreasing the torsional rigidity of the torsional damper applied in the lock-up mechanism. As appreciated from FIG. 5, the torsional vibration intensity is high at low revolutions of the engine because fluctuations in torque generated by the engine are greater at lower engine revolutions. As a result, if the lock-up mechanism is operated at low revolutions, a high torsional vibration intensity is transmitted from the crankshaft to the input shaft, in addition to the torque from the engine thereby causing high level transmission whine or operating noise which results in discomfort for the vehicle occupants. For this reason, as is generally known, the lock-up mechanism is designed so as to operate only at relatively high engine revolutions where torque fluctuations are minimal, that is, the rotation speed of the engine is quite steady.

In this manner, since the lock-up control valve engages the clutch piston with the converter cover within the above described high revolution range, the lock-up mechanism can prevent torque loss occurring between the pump impeller and the turbine runner only within this high revolution range. In other words, the lock-up mechanism of a conventional torque converter can operate only within a relatively narrow revolution range. To accomplish lower fuel consumption than conventional torque converters with a lock-up mechanism, it is desirable that a lock-up mechanism operate within a wider range of revolutions without causing discomfort to the vehicle occupants due to increased operating noise caused by high levels of torsional vibration.

SUMMARY OF THE INVENTION

It is, therefore, an object of the present invention to provide a torque converter with a lock-up mechanism for automatic transmissions, in which the lock-up mechanism can be operated over a relatively wide range without discomfort to vehicle occupants.

It is another object of the invention to provide a low fuel-consumption type of torque converter.

In order to accomplish the aforementioned and other objects, a lock-up torque converter for automatic transmissions which transmit torque generated by an internal combustion engine from the output shaft thereof to the transmission input shaft, and which includes a converter cover, a turbine hub receiving the input shaft to provide a driving connection, a clutch piston slidably mounted on the turbine hub, and a turbine runner having the outer shell drivingly connected to the hub, comprises first means for damping torsional vibration, the first damping means operably connected between the clutch piston and the turbine hub to provide a driving connection only when the clutch piston engages the converter cover, and second means for damping torsional vibration, the second damping means operably connected between the output shaft and the converter cover to provide a driving connection during operation of the engine.

According to another aspect of the invention, a lock-up torque converter for automatic transmissions as described above comprises a torsional damper for damping torsional vibration, the damper being operably connected between the clutch piston and the turbine hub to provide a driving connection only when the clutch piston engages the converter cover. The damper is disposed in a space defined between the outer shell of the turbine runner and the inner peripheral wall of the clutch piston. The damper includes a pair of annular plates fixed on the inner peripheral wall of the clutch piston. The plates are joined at their outer perimeter and are shaped so as to separate inwardly to be spaced from each other on opposite sides of the flange of the turbine hub. The plates and flange have a plurality of openings arranged concentrically from the axis of the input shaft. The damper includes a plurality of torsion springs one being provided in each of the openings, the springs being operable in parallel with each other. Further included is means for damping torsional vibration, the damping means being operably connected between the output shaft and the converter cover to provide a driving connection during operation of the engine. The damping means includes a hub fixed concentrically on the end of the output shaft (crankshaft) and having a hub flange, and an annular drive plate fixed concentrically on the outer periphery of the converter cover and spaced therefrom. The drive plate is formed of a pair of plates. The hub flange and drive plate have a plurality of openings being arranged concentrically to the axis of the output shaft. The damping means also includes a plurality of torsion springs one being provided in each of the openings, the springs being operable in series parallel with each other. The damping means also includes a pair of annular friction washers fixed on opposite sides of the hub flange of the hub and mating with the inner walls of the pair of plates forming the drive plate.

The friction washers act as a torque limiter, in which the hub and drive plate rotate together without slip therebetween, when the torque from the output shaft is less than a predetermined value depending upon the frictional resistance created by the friction washers, while the hub slightly slips in relation to the drive plate, when the torque is greater than a predetermined value. One of the two plates forming the drive plate includes an axially extending outer periphery, on which the ring gear of the transmission is mounted, and an axially extending inner periphery rotatably supported by a radial bearing to reliably guide the rotational direction thereof about the axis of the output shaft. Each of the openings of the flange of the turbine hub has a slightly greater width than the outer diameter of each spring of the damper and each of the openings in the pair of plates of the damper has a slightly smaller width than the outer diameter of each spring in a manner so as to operably support each spring of the damper. Each of openings of the hub flange for the damping means has a slightly greater width than the outer diameter of each spring of the damping means and each of the openings of the pair of plates of the damping means has a slightly smaller than the outer diameter of each spring in a manner so as to operably support each spring of the damping means. The converter cover includes a circumferentially spaced plurality of weld nuts fixed on the outer peripheral wall thereof to define a predetermined space between the converter cover and drive plate, the converter cover being connected to the drive plate through the weld nuts to the drive plate by means of bolts.

BEST MODE FOR CARRYING OUT THE INVENTION

Figure 1:
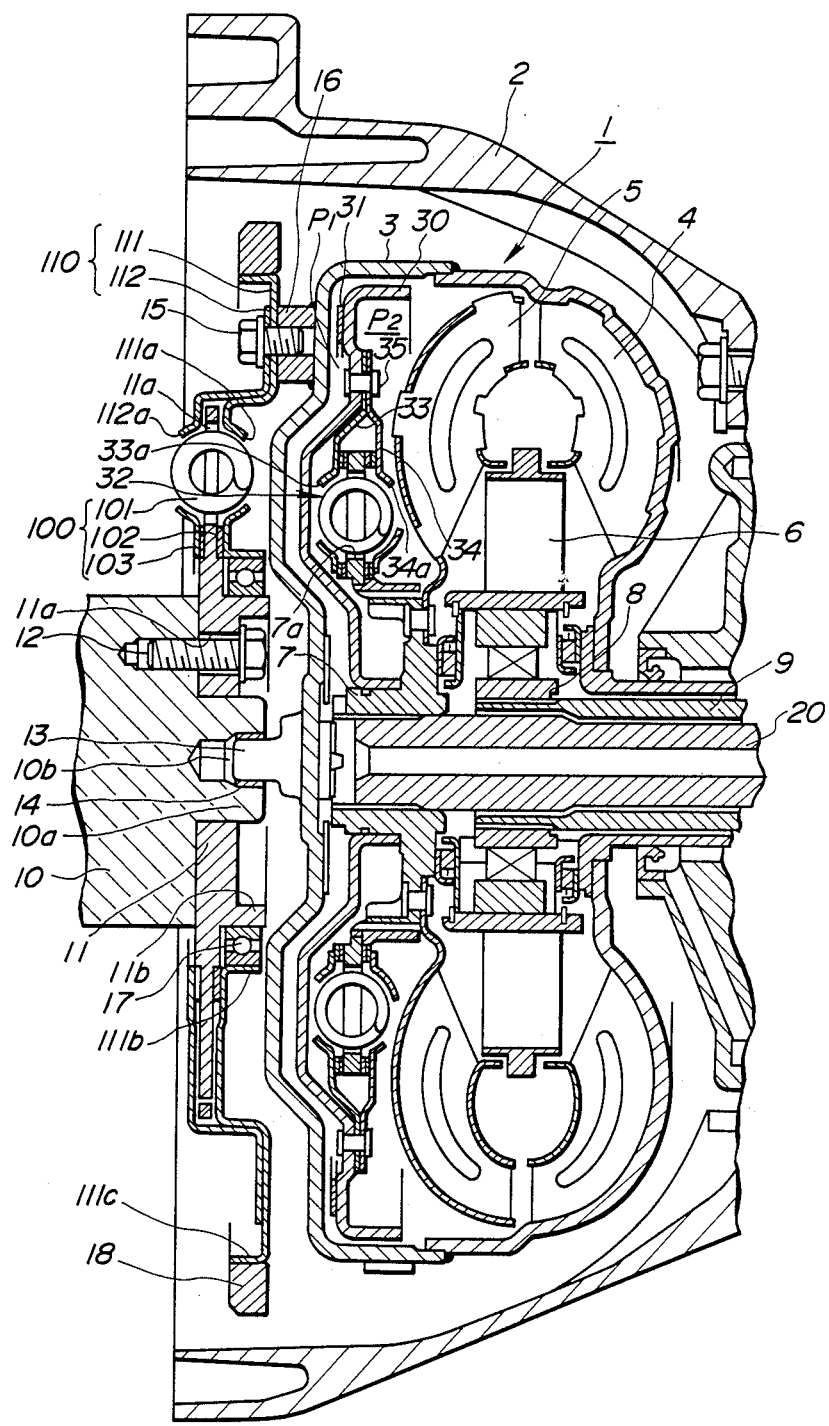
FIG. 1 is a longitudinal cross-sectional view illustrating a preferred embodiment of a lock-up torque converter according to the invention.

Referring now to the drawings, particularly to FIG. 1, there is shown an improved lock-up torque converter 1 for automatic transmissions having, according to the present invention, two torsional dampers. The torque converter 1 is disposed in a converter housing 2. The reference numeral 10 designates an engine crankshaft acting as an engine output shaft into the torque converter. As clearly seen in FIG. 1, a plurality of components of the torque converter 1 are arranged in coaxial fashion with regard to the crankshaft 10. The torque converter 1 includes a converter cover 3, a pump impeller 4, a turbine runner 5, and a stator 6. The converter cover 3 has a cylindrical shape having a closed end and an open end. The pump impeller 4 is fixed by welding to the outer periphery of the converter cover 3 adjacent to the axial end defining the open end thereof so as to be coupled with the converter cover 3. The turbine runner 5 is secured to a turbine hub 7 at a flange portion thereof by riveting. The turbine hub is splined to the end of the transmission input shaft 20. The stator 6 is provided between the pump impeller 4 and the turbine runner 5 to form a torque converter. The stator 6 is mounted to a hollow stationary sleeve 9 via a one way clutch 8. The stationary sleeve 9 permits the transmission input shaft 20 to extend therethrough while maintaining an annular space therearound.

The lock-up mechanism includes a lock-up clutch piston 30, an essentially annular clutch facing 31, a plurality of torsion springs 32 to form a torsional damper, and a pair of damper mounting plates 33 and 34. The clutch piston 30 is slidably mounted on the outer peripheral surface of the hub 7 at the annular inner periphery thereof. The clutch facing 31 is attached to the outer peripheral surface of the clutch piston 30 adjacent to the inner wall of the converter cover 3. The pair of plates 33 and 34 are secured to the clutch piston 30 by a plurality of circumferentially spaced rivets 35. The plurality of torsion springs 32 are respectively provided in a plurality of circumferentially spaced openings 7a formed in the annular hub flange of the hub 7. In order to operably support each torsion spring 32, the pair of plates 33 and 34 have a pair of spring guide portions 33a and 34a defining a pair of openings having slightly smaller opening areas than the opening 7a. In FIG. 1, within the limited space between the right side of the clutch piston 30 and the left side of the turbine runner 5, the torsional damper is operably provided to interconnect the turbine hub 7 and the clutch piston 30.

Additionally, as shown at the right-hand side of FIG. 1, the crankshaft 10 has a central boss 10a and a center bore 10b at the end thereof. An annular hub 11 is inserted into the boss 10a through the circular central opening thereof. The hub 11 is firmly fixed to the end of the crankshaft 10 by means of a plurality of bolts 12 which are screwed into the end of the crankshaft 10 through a circumferentially spaced plurality of holes 11a. Bearing 14 is press-fitted into the center bore 10b to rotatably support a centering shaft 13 extending from the axial portion of the closed end wall of the converter cover 3 to the center bore 10b.

The hub 11 is connected through the torsional damper 100 to a drive plate 110. The drive plate 110 is comprised of a substantially annular first plate 111 and a substantially annular second plate 112. The first and second plates 111 and 112 are together connected to the outer peripheral wall of the converter cover 3 by means of a plurality of bolts 15. The respective bolts 15 are screwed into a plurality of weld nuts 16 which are welded in a circumferentially spaced state and are firmly fixed on the outer peripheral wall of the converter cover 3. On the L-shaped cross-sectional portion 111c formed on the outer periphery of the first plate 111 to provide a required rigidity. A ring gear 18 is mounted on the L-shaped portion 111c. Furthermore, the drive plate 110 is rotatably supported by a radial ball bearing 17 at a cylindrical portion 111b thereof in such a manner torso as to reliably guide the rotational direction thereof about the axis of the crankshaft 10. The radial ball bearing 17 is press-fitted to the outer peripheral surface of the annular portion 11b of the hub 11.

The torsional damper 100 of the preferred embodiment is comprised of a plurality of torsion springs 101 which are respectively disposed in a circumferentially spaced plurality of openings 11a formed in the flange of the hub 11, and a pair of annular friction washers 102 and 103 firmly attached to opposite sides of the outermost perimeter of the flange of the hub 11. The friction washer 102 is frictionally sandwiched between one side wall of the flange of the hub 11 and the first plate 111, while the friction washer 103 is frictionally sandwiched between the opposite side wall of the flange and the second plate 112, respectively. In order to operably support each torsion spring 101, the two plates 111 and 112 have a pair of spring guide portions 111a and 112a defining a pair of openings having a slightly smaller opening area than the opening 11a. The plurality of torsion springs 101 operate in parallel with each other to dampen transmission of hub rotation to the drive plate 110 and as a result, torsional vibration is partly absorbed by these springs 101. The pair of friction washers 102 and 103 act as a torque limiter, by which the hub 11 and drive plate 110 rotate together without slip therebetween, when the torque from the crankshaft 10 is less than a predetermined value depending upon the frictional resistance created by the friction washers 102 and 103. On the other hand, the hub 11 slightly slips in relation to the drive plate 110, when the torque is greater than the predetermined value described above. In other words, the two friction washers 102 and 103 directly transmit the torque from the crankshaft to the drive plate 110, when the torque is relatively low, i.e., when the engine revolutions are in a steady state. However, when the torque is relatively high, i.e., when fluctuations in engine revolution are great, the engagement between the hub 11 and the drive plate 110 is released by impact due to fluctuations in torque or high torque created by the action of the crankshaft against the friction force created by the friction washers. In this manner, the torsional damper 100 provides optimum transmission efficiency between the hub 11 and the drive plate 110.

In this construction, when the vehicle speed exceeds a predetermined speed in which fluctuations in torque of the engine are not experienced as a problem, the lock-up control valve (not shown) of the lock-up mechanism operates such that a first hydraulic pressure $P_1$ becomes less than a second hydraulic pressure $P_2$. According to the difference in pressure ($P_1 31 P_2$) created between the both sides of the clutch piston 30, the clutch piston 30 moves toward the left (viewing in FIG. 1) to establish engagement between the clutch facing 31 and the inner peripheral wall of the converter cover 3. When the clutch facing 31 firmly engages the converter cover 3, the clutch piston 30 will be directly connected to the converter cover 3. Therefore, torque generated from the engine (not shown) is transmitted from the crankshaft 10 to the transmission input shaft 20 through the hub 11, the torsional damper 100, the drive plate 110, the converter cover 3, the clutch facing 31, the clutch piston 30, the damper mounting plates 33, and 34, the lock-up torsion springs 32, and the turbine hub 7, in that order. In other words, during operation of the lock-up mechanism, torque from the crankshaft 10 is transmitted to the input shaft 20 through the two torsional dampers 100 and 32 connected in series to each other. Therefore, the impact upon initiation of the transmission of the rotational torque will be sufficiently absorbed by the two torsional dampers 100 and 32. As a result, an optimum damping effect is obtained over a wide range extending from relatively low engine revolutions to relatively high ones, as shown in the graphs in FIGS. 3 and 4, which will be described in detail hereinbelow.

When the vehicle speed is less than the above mentioned predetermined speed, that is when vehicle operating conditions do not satisfy a predetermined condition in which lock-up clutch engagement is required, the lock-up control valve (not shown) of the lock-up mechanism operates such that the first pressure $P_1$ becomes greater than the second pressure $P_2$. By the difference between the two pressures $P_1$ and $P_2$, the clutch piston 30 moves to the right (referring to FIG. 1) to terminate the engagement between the clutch facing 31 and the inner peripheral wall of the converter cover 3. Thus, the clutch piston 30 is held disengaged from the converter cover 3. In this state, torque is transmitted from the crankshaft 10 to the converter cover 3 through the hub 11, the torsional damper 100, and the drive plate 110 in that order. Thereafter, the operating fluid will transmit the torque from the pump impeller 4 to the turbine runner 5 by the action of the stator 6. The rotation of the turbine runner 5 is transmitted to the transmission input shaft 20 so that the engine power output to the torque converter may be input from the torque converter to the gear train (not shown) of the transmission.

As previously described, the construction and operation of a lock-up torque converter having a torsional damper in the converter cover thereof has been disclosed in detail in the U.S. Pat. No. 4,305,487 entitled "LOCK-UP TORQUE CONVERTER WITH DAMPER". The disclosure of the above-identified United States Patent is herein incorporated by reference for the sake of simplifying the disclosure.

Figure 2:
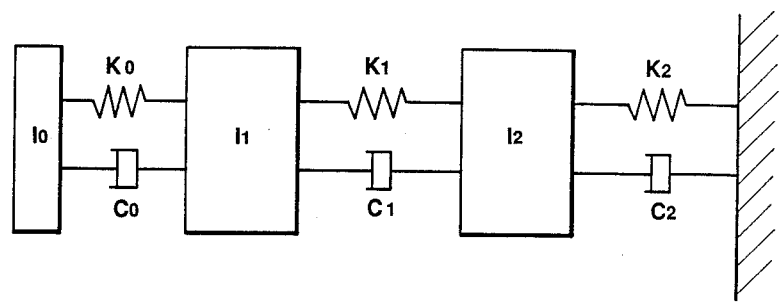
FIG. 2 is a model illustrating an arrangement of the vibration system of the embodiment according to the invention.

As shown in FIG. 2, the preferred embodiment is represented as a model illustrating an arrangement of the vibration system.

In this model, the respective reference numerals designate the following meanings:

$I_0$: a moment of inertia of the crankshaft 10;

$I_1$: a moment of inertia of the converter cover 3, the clutch piston 30, the centering shaft 13, the pump impeller 4, and the weld nuts 16;

$I_2$: a moment of inertia of the turbine hub 7, the turbine runner 5;

$K_0$: a torsional rigidity of the torsional damper 100;

$K_1$: a torsional rigidity of the lock-up torsional damper 32;

$K_2$: a torsional rigidity of the drive shaft (not shown) engaged with the transmission input shaft 20 of the power train (not shown);

$C_0$: a resistance force created among the crankshaft 10, the hub 11, the pair of friction washers 102 and 103, the torsion springs 101, the drive plate 110, during operation, particularly a frictional resistance created between the two friction washers and the two plates 111, 112;

$C_1$: a viscous resistance created among the above mentioned elements forming the moment of inertia $I_1$, the spring plates 33, 34, the torsion springs 32, during operation, and a resistance force created among them;

$C_2$: a viscous resistance created among the the above mentioned elements forming the moment of inertia $I_2$ and the drive shaft (not shown) engaged with the input shaft 20 during operation, and a resistance force created among them;

In order to compare a conventional torque converter with a lock-up mechanism having only a lock-up torsional damper with an improved torque converter having two torsional dampers with a lock-up mechanism according to the present invention, the applicant of the invention made experiments on torsional vibration by using six models A to F formed in combination with two different values 1 kgfm/deg and 6 kgfm/deg as two torsional rigidities $K_0$ and $K_1$, as shown in Table 1. The results are shown in FIGS. 3 to 5.

TABLE 1

| Model No. | $K_0$ (kgfm/deg) | $K_1$ (kgfm/deg) |
|---|---|---|
| A | — | 6 |
| B | — | 1 |
| C | 1 | 1 |
| D | 6 | 1 |
| E | 6 | 6 |
| F | 1 | 6 |

Figure 3:
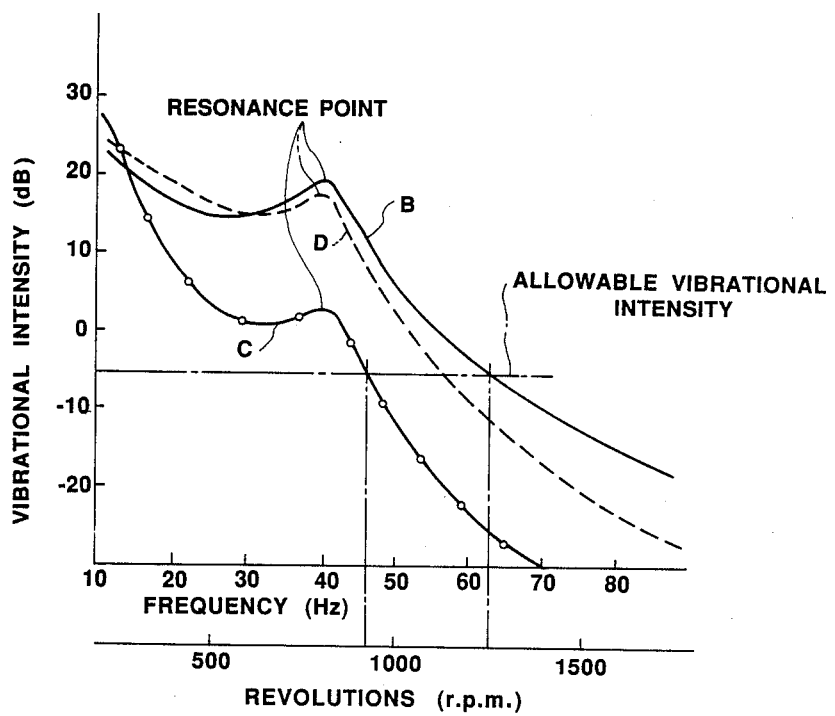
FIGS. 3 and 4 are graphs representative of the relationship between torsional vibration intensity and the frequency of torsional vibration at different torsional rigidities with regard to the torque converters of the prior art and the present invention.
Figure 4:
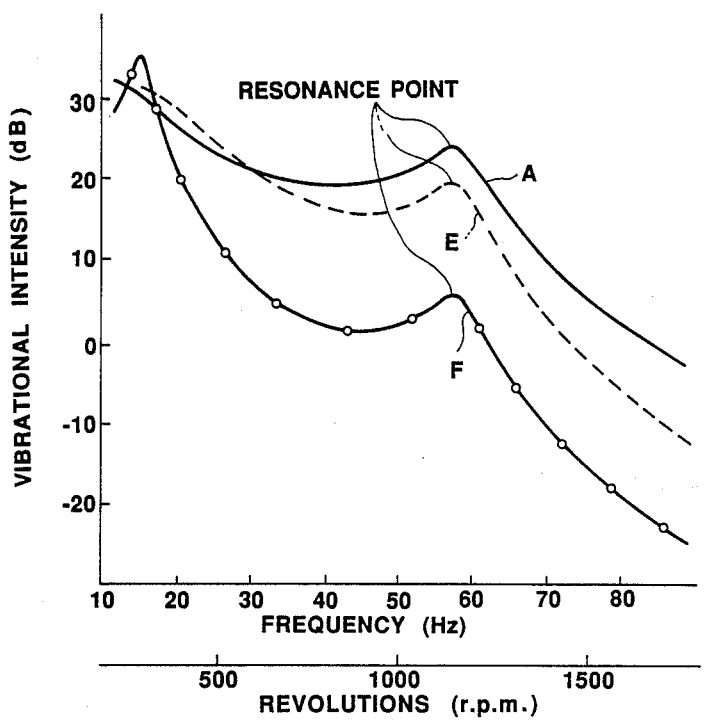
Figure 5:
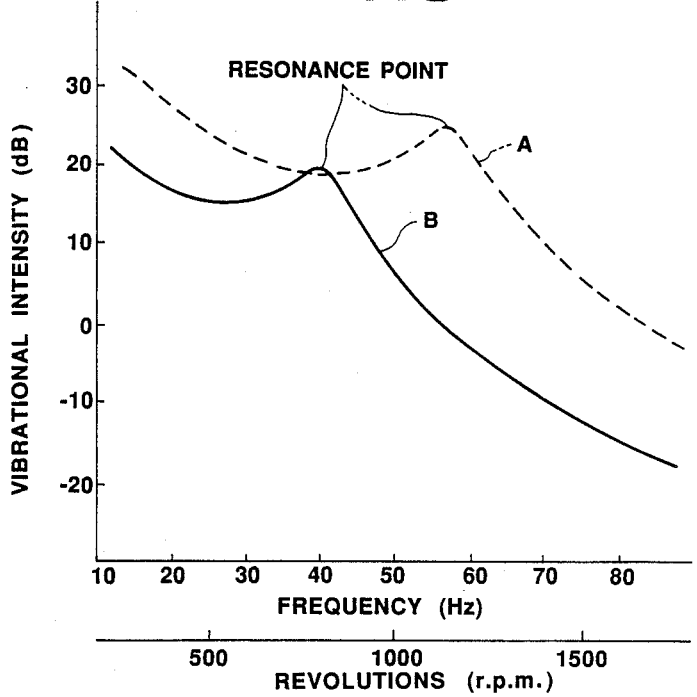
FIG. 5 is a graph representative of the relationship between torsional vibration intensity and the frequency of torsional vibration at two different torsional rigidities with regard to a prior art torque converter having a lock-up mechanism.

In FIGS. 3 to 5, torsional frequency of the driving system and revolutions of the engine are taken along the axis of abscissas, while torsional vibration intensity of the driving system is taken along the ordinate axis.

As seen in FIG. 3, in models B, C, and D the torsional rigidity $K_1=1$ kgfm/deg When a conventional torque converter (Model B) is compared with those of the invention (Models C or D), the resonance points of three models are substantially equal. However, with regard to the level of torsional vibration, models C and D are lower than model B. Model C in particular, with the torsional rigidity of $K_0$ being less than model D, shows considerably less torsional vibration than model B. That is, model C has extremely high vibration damping characteristics.

Likewise, as seen in FIG. 4, when the torsional rigidity of $K_1=6$ kgfm/deg, torque converters according to the invention (Models E or F) as well as a conventional torque converter (Model A), have resonance points that are substantially equal, but with regard to the intensity of the torsional vibration, models E and F are significantly lower than model A, model F particularly has extremely high vibration damping characteristics.

In FIG. 3, a level of allowable torsional vibration intensity during operation of the lock-up mechanism is illustrated as a dashed line. It will be noted that when comparing frequencies of torsional vibration between model B representative of the conventional torque converter and model C representative of the improved torque converter of the invention, the frequency of model C is considerably lower than that of model B. Using the models in FIG. 3 as an example only, the conventional torque converter is effective only at revolutions greater than a substantial 1,250 r.p.m., whereas the improved torque converter can substantially be operated at revolutions of 900 r.p.m.

As will be appreciated from the above, with a torque converter having two torsional dampers according to the invention, acceptable vehicle speeds for the engagement of the lock-up mechanism may be set relatively low. A lock-up mechanism being capable of operating at relatively low speeds will consequently provide low fuel-consumption characteristics to a vehicle.

While the foregoing is a description of the best mode for carrying out the invention, it will be understood that the invention is not limited to the particular embodiment shown and described herein, but may include variations and modifications without departing from the scope or spirit of this invention as described by the following claims.

What is claimed is:

1. A lock-up torque converter for automatic transmissions which transmits torque generated by an internal combustion engine from the output shaft thereof to the transmission input shaft, and which includes a converter cover, a turbine hub receiving said input shaft to provide a driving connection, a clutch piston slidably mounted on said turbine hub, and a turbine runner having an outer shell drivingly connected to said hub, comprising:

first means for damping torsional vibration, said first damping means operably connected between said clutch piston and said turbine hub to provide a driving connection only when said clutch piston engages said converter cover, said first means comprising a plurality of torsion springs operable in parallel with each other; and second means for damping torsional vibration, said second damping means operably connected between said output shaft and said converter cover to provide a driving connection during operation of the engine, said second means comprising a plurality of torsion springs operable in parallel with each other, whereby said first and second means are cooperatively operated in series with each other only when said clutch piston engages said converter cover.

2. A lock-up torque converter for automatic transmission which transmits torque generated by an internal combustion engine from the output shaft thereof to the transmission input shaft, and which includes a converter cover, a turbine hub receiving said input shaft to provide a driving connection, a clutch piston slidably mounted on said turbine hub, said turbine hub having a flange, and a turbine runner having an outer shell drivingly connected to said hub, comprising:

a torsional damper for damping torsional vibration, said damper operably connected between said clutch piston and said turbine hub to provide a driving connection only when said clutch piston engages said converter cover;

said damper being disposed in a space defined between the outer shell of said turbine runner and an inner peripheral wall of said clutch piston;

said damper including a pair of plates fixed on the inner peripheral wall of said clutch piston and disposed on the opposite sides of the flange of said turbine hub;

said plates and flange having a plurality of openings being arranged concentrically to the axis of said input shaft;

said damper including a plurality of torsion springs respectively provided in each of said openings, said springs being operable in parallel with each other;

means for damping torsional vibration, said damping means operably connected between said output shaft and said converter cover to provide a driving connection during operation of the engine;

said damping means including a hub fixed coaxially on an end of said output shaft and having a hub flange, and an annular drive plate fixed on an outer periphery of said converter cover and spaced therefrom, said drive plate and said converter cover being arranged concentrically with said input shaft;

said hub flange and drive plate having a plurality of openings being arranged concentric to the axis of said output shaft; and said damping means including a plurality of torsion springs respectively provided in each of said openings, said springs of said damping means being operable in parallel with each other.

3. A lock-up torque converter for automatic transmissions which transmits torque generated by an internal combustion engine from the output shaft thereof to the transmission input shaft, and which includes a converter cover, a turbine hub receiving said input shaft to provide driving connection, a clutch piston slidably mounted on said turbine hub, said turbine hub having a flange, and a turbine runner having an outer shell drivingly connected to said hub, comprising:

a torsional damper for damping torsional vibration, said damper operably connected between said clutch piston and said turbine hub to provide a driving connection only when said clutch piston engages said converter cover;

said damper disposed in a space defined between the outer shell of said turbine runner and an inner peripheral wall of said clutch piston;

said damper including a pair of plates fixed on the inner peripheral wall of said clutch piston, said plates disposed on the opposite sides of the flange of said turbine hub and spaced from each other;

said plates and flange having a plurality of openings being arranged concentric to the axis of said input shaft;

said damper including a plurality of torsion springs respectively provided in each of said openings, said springs being operable in parallel with each other;

means for damping torsional vibration, said damping means operably connected between said output shaft and said converter cover to provide a driving connection during operation of the engine;

said damping means including a hub fixed coaxially on an end of said output shaft and having a hub flange, and an annular drive plate fixed on an outer periphery of said converter cover and spaced therefrom, said drive plate and said converter being arranged concentrically with said input shaft, said drive plate being formed of a pair of plates;

said hub flange and drive plate having a plurality of openings arranged concentrically to the axis of said output shaft;

said damping means including a plurality of torsion springs respectively provided in each of said openings, said torsion springs of said damping means being operable in parallel with each other; and said damping means including a pair of friction plates fixed on opposite sides of the hub flange of said hub and mating with inner walls of the pair of plates forming said drive plate.

4. The lock-up torque converter as set forth in claim 3, wherein said friction plates are comprised of a pair of annular friction washers acting as a torque limiter, in which said hub and said drive plate rotate together without slip therebetween, when the torque from said output shaft is less than a predetermined value depending upon the frictional resistance created by said friction washers, while said hub slightly slips in relation to said drive plate, when the torque is greater than said predetermined value.

5. The lock-up torque converter as set forth in claim 4, wherein one of the two plates forming said drive plate includes an axially extending outer periphery, on which a ring gear of said transmission is mounted, and an axially extending inner periphery rotatably supported by a radical bearing to reliably guide the rotational direction of said drive plate about the axis of said output shaft.

6. A lock-up torque converter as set forth in claim 3, wherein each of the openings of the flange of said turbine hub has a slightly greater width than an outer diameter of one of the springs of said damper and each of the openings of the pair of plates of said damper has a slightly smaller width than the outer diameter of one of the springs of said damper in a manner so as to operably support each spring of said damper.

7. The lock-up torque converter as set forth in claim 3, wherein each of the openings in the hub flange for said damping means has a slightly greater width than an outer diameter of one of the springs of said damping means and each of the openings of the pair of plates of said damping means has a slightly smaller width than the outer diameter of one of the springs of said damping means in a manner so as to operably support each spring of said damping means.

8. The lock-up torque converter as set forth in claim 3, wherein said converter cover includes a circumferentially spaced plurality of weld nuts fixed on outer peripheral wall thereof to define a predetermined space between said converter cover and said drive plate, said converter cover being interconnected through said weld nuts to said drive plate by means of bolts.

* * * * *